United States Patent
Song et al.

(10) Patent No.: US 10,110,266 B2
(45) Date of Patent: Oct. 23, 2018

(54) SYMBOL INTERFERENCE CANCELLATION CIRCUIT AND SYSTEM INCLUDING THE SAME

(71) Applicant: SK hynix Inc., Icheon-si, Gyeonggi-do (KR)

(72) Inventors: Jun Yong Song, Seoul (KR); Jeong Kyoum Kim, Icheon-si (KR); Hyung Soo Kim, Hwaseong-si (KR); Han Kyu Chi, Seoul (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 0 days.

(21) Appl. No.: 15/700,760

(22) Filed: Sep. 11, 2017

(65) Prior Publication Data

US 2018/0183474 A1    Jun. 28, 2018

(30) Foreign Application Priority Data

Dec. 26, 2016   (KR) .................. 10-2016-0179301
Dec. 26, 2016   (KR) .................. 10-2016-0179330

(51) Int. Cl.
   *H04B 1/10*   (2006.01)
(52) U.S. Cl.
   CPC .................................. *H04B 1/1036* (2013.01)
(58) Field of Classification Search
   CPC ... H04B 1/1036; H04L 7/0058; H04L 7/0062; H04L 25/03019
   See application file for complete search history.

(56) References Cited

U.S. PATENT DOCUMENTS

| 7,176,721 B2 | 2/2007 | Ho et al. |
| 9,112,740 B2 | 8/2015 | Amamiya |
| 2014/0208149 A1 | 7/2014 | Canac et al. |
| 2016/0182259 A1* | 6/2016 | Musah ................ H04L 7/0058 375/233 |

FOREIGN PATENT DOCUMENTS

KR   1020120110431 A   10/2012

* cited by examiner

*Primary Examiner* — Kabir A Timory
(74) *Attorney, Agent, or Firm* — William Park & Associates Ltd.

(57) ABSTRACT

A symbol interference cancellation circuit may include a CTLE (continuous time linear equalizer) configured for cancelling a first post cursor component of an input signal according to a first weight application signal, and generating a pre-interference-cancelled signal; an interference cancellation circuit configured for cancelling second to fourth post cursor components of the pre-interference-cancelled signal according to second to fourth weight application signals, a sampling signal and output signals of shift registers, and generating an interference-cancelled signal; a sampling circuit configured for sampling the interference-cancelled signal based on a clock signal, and outputting the sampled interference-cancelled signal as the sampling signal; and the shift registers configured for shifting the sampling signal by a predetermined cycle of a clock bar signal which has a phase opposite to the clock signal, shifting the sampling signal by a predetermined cycle of the clock signal, and thereby providing shifted signals to the interference cancellation circuit.

20 Claims, 7 Drawing Sheets

SYMBOL INTERFERENCE CANCELLATION CIRCUIT AND SYSTEM INCLUDING THE SAME

CROSS-REFERENCES TO RELATED APPLICATION

The present application claims priority under 35 U.S.C. § 119(a) to Korean application number 10-2016-0179301 and 10-2016-0179330, filed on Dec. 26, 2016, in the Korean Intellectual Property Office, which is incorporated herein by reference in its entirety.

BACKGROUND

1. Technical Field

Various embodiments may generally relate to a semiconductor integrated circuit, and, more particularly, to a symbol interference cancellation circuit and system including the same.

2. Related Art

A semiconductor integrated circuit is a circuit which transmits and receives electrical signals.

As the speed of a semiconductor integrated circuit increases, a speed at which signals are transmitted and received is also increased.

As the transmission and reception speed of a signal increases, interference between signal symbols increases. Such an increase in interference causes a problem for accurate and fast transmission and reception of signals.

SUMMARY

In an embodiment, a symbol interference cancellation circuit may be provided. The symbol interference cancellation circuit may include a CTLE (continuous time linear equalizer) configured for cancelling a first post cursor component of an input signal according to a first weight application signal, and generating a pre-interference-cancelled signal. The symbol interference cancellation circuit may include an interference cancellation circuit configured for cancelling a second post cursor component, a third post cursor component and a fourth post cursor component of the pre-interference-cancelled signal according to a second weight application signal, a third weight application signal, a fourth weight application signal, a sampling signal and output signals of shift registers, and generating an interference-cancelled signal. The symbol interference cancellation circuit may include a sampling circuit configured for sampling the interference-cancelled signal based on a clock signal, and outputting the sampled interference-cancelled signal as the sampling signal. The symbol interference cancellation circuit may include the shift registers configured for shifting the sampling signal by a predetermined cycle of a clock bar signal which has a phase opposite to the clock signal, shifting the sampling signal by a predetermined cycle of the clock signal, and thereby providing shifted signals to the interference cancellation circuit.

In an embodiment, a symbol interference cancellation circuit may be provided. The symbol interference cancellation circuit may include a CTLE (continuous time linear equalizer) configured for cancelling a first post cursor component of an input signal according to a first weight application signal, and generating a pre-interference-cancelled signal. The symbol interference cancellation circuit may include a first interference cancellation circuit configured for cancelling a second post cursor component, a third post cursor component and a fourth post cursor component of the pre-interference-cancelled signal according to a second weight application signal, a third weight application signal, a fourth weight application signal, a first sampling signal and output signals of a first-first shift register and a second-second shift register, and generating a first interference-cancelled signal. The symbol interference cancellation circuit may include a second interference cancellation circuit configured for cancelling a second post cursor component, a third post cursor component and a fourth post cursor component of the pre-interference-cancelled signal according to the second weight application signal, the third weight application signal, the fourth weight application signal, a second sampling signal and output signals of a first-second shift register and a second-first shift register, and generating a second interference-cancelled signal. The symbol interference cancellation circuit may include a first sampling circuit configured for sampling the first interference-cancelled signal based on a clock signal, and outputting the sampled first interference-cancelled signal as the first sampling signal. The symbol interference cancellation circuit may include a second sampling circuit configured for sampling the second interference-cancelled signal based on the clock signal, and outputting the sampled second interference-cancelled signal as the second sampling signal. The symbol interference cancellation circuit may include the first-first shift register configured for shifting the first sampling signal by a predetermined cycle of the clock signal, and outputting the output signal. The first-second shift register may be configured for shifting the first sampling signal by a predetermined cycle of a clock bar signal which has a phase opposite to the clock signal, and outputting the output signal. The second-first shift register may be configured for shifting the second sampling signal by a predetermined cycle of the clock signal, and outputting the output signal. The second-second shift register may be configured for shifting the second sampling signal by a predetermined cycle of the clock bar signal, and outputting the output signal.

In an embodiment, a symbol interference cancellation circuit may be provided. The symbol interference cancellation circuit may include an interference cancellation circuit configured for cancelling a second post cursor component, a third post cursor component and a fourth post cursor component of an input signal according to a second weight application signal, a third weight application signal, a fourth weight application signal, a sampling signal and output signals of shift registers, and generating an interference-cancelled signal. The symbol interference cancellation circuit may include a sampling circuit configured for cancelling a first post cursor component of the interference-cancelled signal based on a first weight application signal and a clock signal, sample the interference-cancelled signal cancelled with the first post cursor component, and generating the sampling signal. The shift registers may be configured for shifting the sampling signal by a predetermined cycle of a clock bar signal which has a phase opposite to the clock signal, shift the sampling signal by a predetermined cycle of the clock signal, and thereby provide shifted signals to the interference cancellation.

In an embodiment, a symbol interference cancellation circuit may be provided. The symbol interference cancellation circuit may include a first interference cancellation circuit configured for cancelling a second post cursor component, a third post cursor component and a fourth post cursor component of an input signal according to a second weight application signal, a third weight application signal, a fourth weight application signal, a first sampling signal and output signals of a first-first shift register and a second-second shift register, and generating a first interference-cancelled signal. The symbol interference cancellation circuit may include a second interference cancellation circuit configured for cancelling a second post cursor component, a third post cursor component and a fourth post cursor component of the input signal according to the second weight application signal, the third weight application signal, the fourth weight application signal, a second sampling signal and output signals of a first-second shift register and a second-first shift register, and generating a second interference-cancelled signal. The symbol interference cancellation circuit may include a sampling circuit configured for cancelling first post cursor components of the first and second interference-cancelled signals based on a first weight application signal and a clock signal, sample the first and second interference-cancelled signals cancelled with the first post cursor components, and generating the first and second sampling signals. The first-first shift register may be configured for shifting the first sampling signal by a predetermined cycle of the clock signal, and outputting the output signal. The first-second shift register may be configured for shifting the first sampling signal by a predetermined cycle of a clock bar signal which has a phase opposite to the clock signal, and outputting the output signal. The second-first shift register may be configured for shifting the second sampling signal by a predetermined cycle of the clock signal, and outputting the output signal. The second-second shift register may be configured for shifting the second sampling signal by a predetermined cycle of the clock bar signal, and outputting the output signal.

In an embodiment, a symbol interference cancellation circuit may be provided. The symbol interference cancellation circuit may include an interference cancellation circuit configured for cancelling a first post cursor component, second post cursor component, a third post cursor component and a fourth post cursor component of the pre-interference-cancelled signal according to a first weight application signal, second weight application signal, a third weight application signal, a fourth weight application signal, a sampling signal and output signals of shift registers, and generating an interference-cancelled signal. The symbol interference cancellation circuit may include a sampling circuit configured for sampling the interference-cancelled signal based on a clock signal, and outputting the sampled interference-cancelled signal as the sampling signal. The shift registers, may be configured for shifting the sampling signal by a predetermined cycle of a clock bar signal which has a phase opposite to the clock signal, shift the sampling signal by a predetermined cycle of the clock signal, and provide shifted signals to the interference cancellation circuit.

DETAILED DESCRIPTION

Hereinafter, a symbol interference cancellation circuit will be described below with reference to the accompanying drawings through various examples of embodiments.

Figure 1:
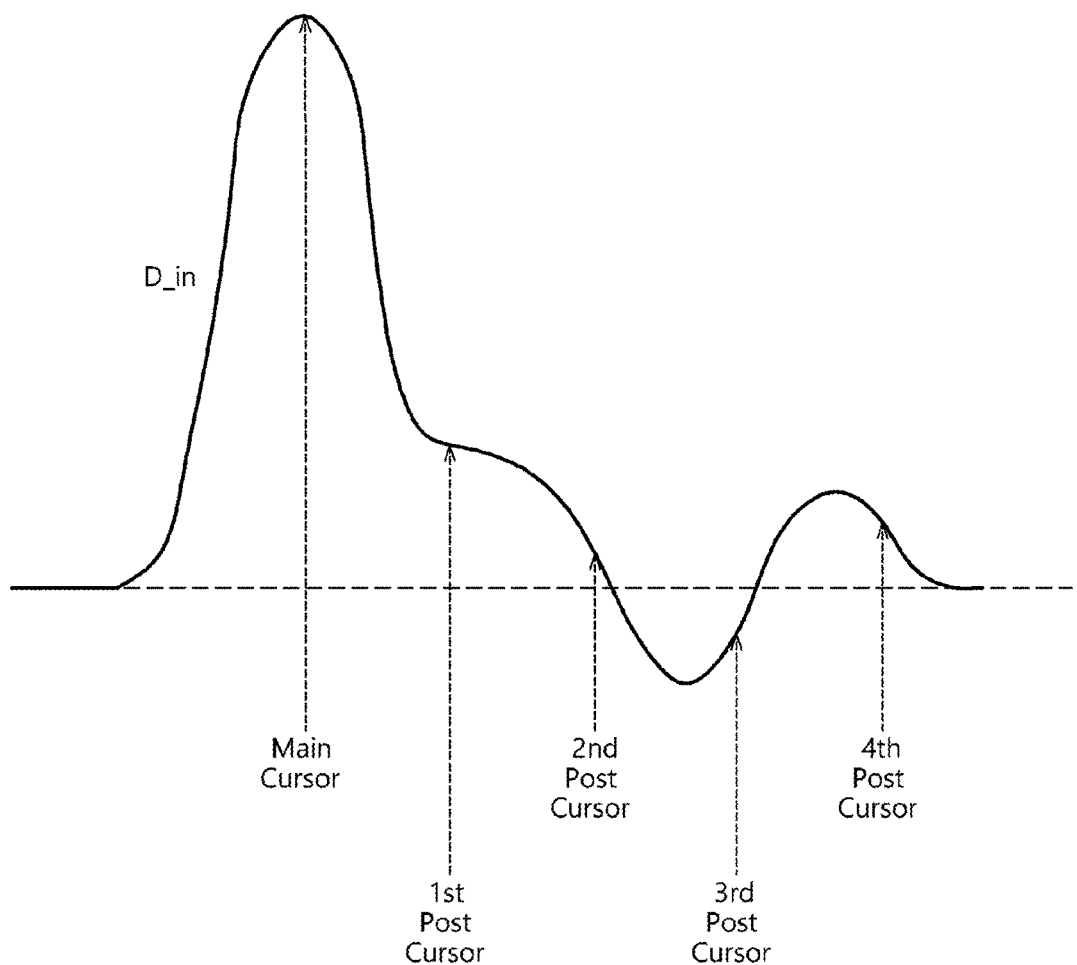
FIG. 1 is a representation of an example of a timing diagram to assist in the explanation of the operation of a symbol interference cancellation circuit in accordance with an embodiment.

Embodiments may relate to technologies capable of cancelling interferences between symbols illustrated in FIG. 1.

Symbol interference cancellation circuits according to the embodiments may be inputted with an input signal D_in illustrated in FIG. 1.

The main cursor component of the input signal D_in illustrated in FIG. 1 is a meaningful component of the input signal D_in. Also, first to fourth post cursor components of the input signal D_in are meaningless components of the input signal D_in. The first to fourth post cursor components may be generated due to interferences between the symbols of the input signal D_in.

The symbol interference cancellation circuits according to the embodiments may be technologies for cancelling the first to fourth post cursor components.

Figure 2:
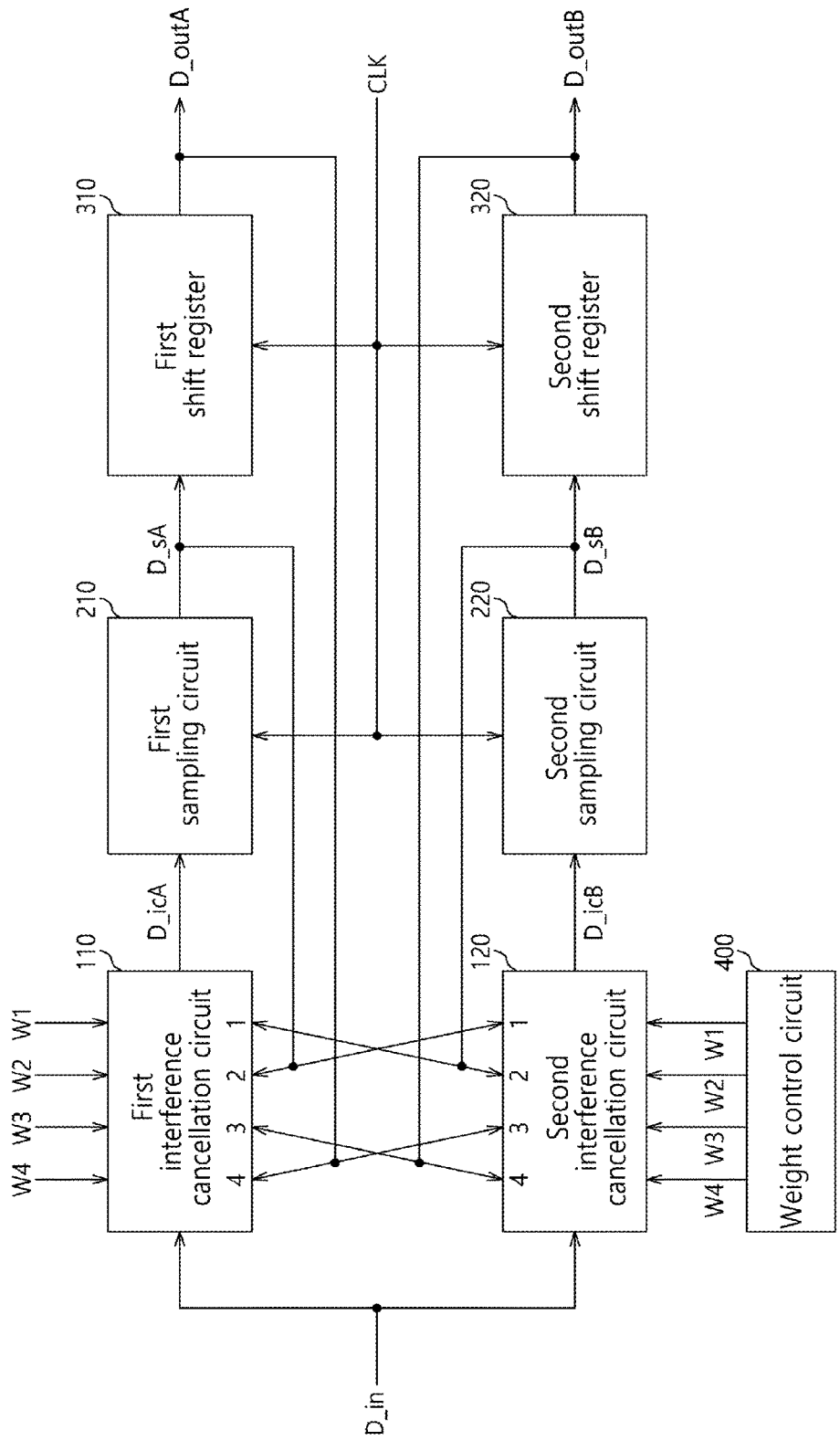
FIG. 2 is a configuration diagram illustrating a representation of an example of the symbol interference cancellation circuit in accordance with an embodiment.

Referring to FIG. 2, a symbol interference cancellation circuit in accordance with an embodiment may include first and second interference cancellation circuits 110 and 120, first and second sampling circuits 210 and 220, first and second shift registers 310 and 320, and a weight control circuit 400.

The first interference cancellation circuit 110 may generate a first interference-cancelled signal D_icA by cancelling the first to fourth post cursor components of the input signal D_in inputted to the first interference cancellation circuit 110, in response to first to fourth weight application signals W1, W2, W3 and W4, first and second sampling signals D_sA and D_sB and first and second output signals D_outA and D_outB. For example, the first interference cancellation circuit 110 may cancel the first post cursor component in response to the second sampling signal D_sB inputted to a first input terminal 1 and the first weight application signal W1. The first interference cancellation circuit 110 may cancel the second post cursor component in response to the first sampling signal D_sA inputted to a second input terminal 2 and the second weight application signal W2. The first interference cancellation circuit 110 may cancel the third post cursor component in response to the second output signal D_outB inputted to a third input terminal 3 and the third weight application signal W3. The first interference cancellation circuit 110 may cancel the fourth post cursor component in response to the first output signal D_outA inputted to a fourth input terminal 4 and the fourth weight application signal W4. The first and second sampling signals D_sA and D_sB and the first and second output signals D_outA and D_outB inputted to the first to fourth input terminals 1 to 4 of the first interference cancellation circuit 110 may include cancellation timings of cursor components, and the first to fourth weight application signals W1, W2, W3 and W4 may include amounts of the cursor components to be cancelled.

The first sampling circuit 210 may sample the first interference-cancelled signal D_icA in response to a clock CLK signal, and output a sampling result as the first sampling signal D_sA. The first sampling circuit 210 may be embodied by a latch type sense amplifier.

The first shift register 310 may shift the first sampling signal D_sA by a predetermined cycle of the clock CLK signal, and output the first output signal D_outA. The first shift register 310 may be embodied by a flip-flop.

The second interference cancellation circuit 120 may generate a second interference-cancelled signal D_icB by cancelling the first to fourth post cursor components of the input signal D_in inputted to the second interference cancellation circuit 120, in response to the first to fourth weight application signals W1, W2, W3 and W4, the first and second sampling signals D_sA and D_sB and the first and second output signals D_outA and D_outB. For example, the second interference cancellation circuit 120 may cancel the first post cursor component in response to the first sampling signal D_sA inputted to a first input terminal 1 and the first weight application signal W1. The second interference cancellation circuit 120 may cancel the second post cursor component in response to the second sampling signal D_sB inputted to a second input terminal 2 and the second weight application signal W2. The second interference cancellation circuit 120 may cancel the third post cursor component in response to the first output signal D_outA inputted to a third input terminal 3 and the third weight application signal W3. The second interference cancellation circuit 120 may cancel the fourth post cursor component in response to the second output signal D_outB inputted to a fourth input terminal 4 and the fourth weight application signal W4. The first and second sampling signals D_sA and D_sB and the first and second output signals D_outA and D_outB inputted to the first to fourth input terminals 1 to 4 of the second interference cancellation circuit 120 may include cancellation timings of cursor components, and the first to fourth weight application signals W1, W2, W3 and W4 may include amounts of the cursor components to be cancelled. While the first interference cancellation circuit 110 and the second interference cancellation circuit 120 are inputted with the input signal D_in, the input signal D_in may be a differential signal, and the first and second interference cancellation circuits 110 and 120, the first and second sampling circuits 210 and 220 and the first and second shift registers 310 and 320 may be embodied by differential circuits.

The second sampling circuit 220 may sample the second interference-cancelled signal D_icB in response to the clock CLK signal, and output a sampling result as the second sampling signal D_sB. The second sampling circuit 220 may be embodied by a latch type sense amplifier.

The second shift register 320 may shift the second sampling signal D_sB by a predetermined cycle of the clock CLK signal, and output the second output signal D_outB. The second shift register 320 may be embodied by a flip-flop.

The weight control circuit 400 may store respective information pertaining to the first to fourth weight application signals W1, W2, W3 and W4, and determine and output the voltage levels of the first to fourth weight application signals W1, W2, W3 and W4 according to the information.

Figure 3:
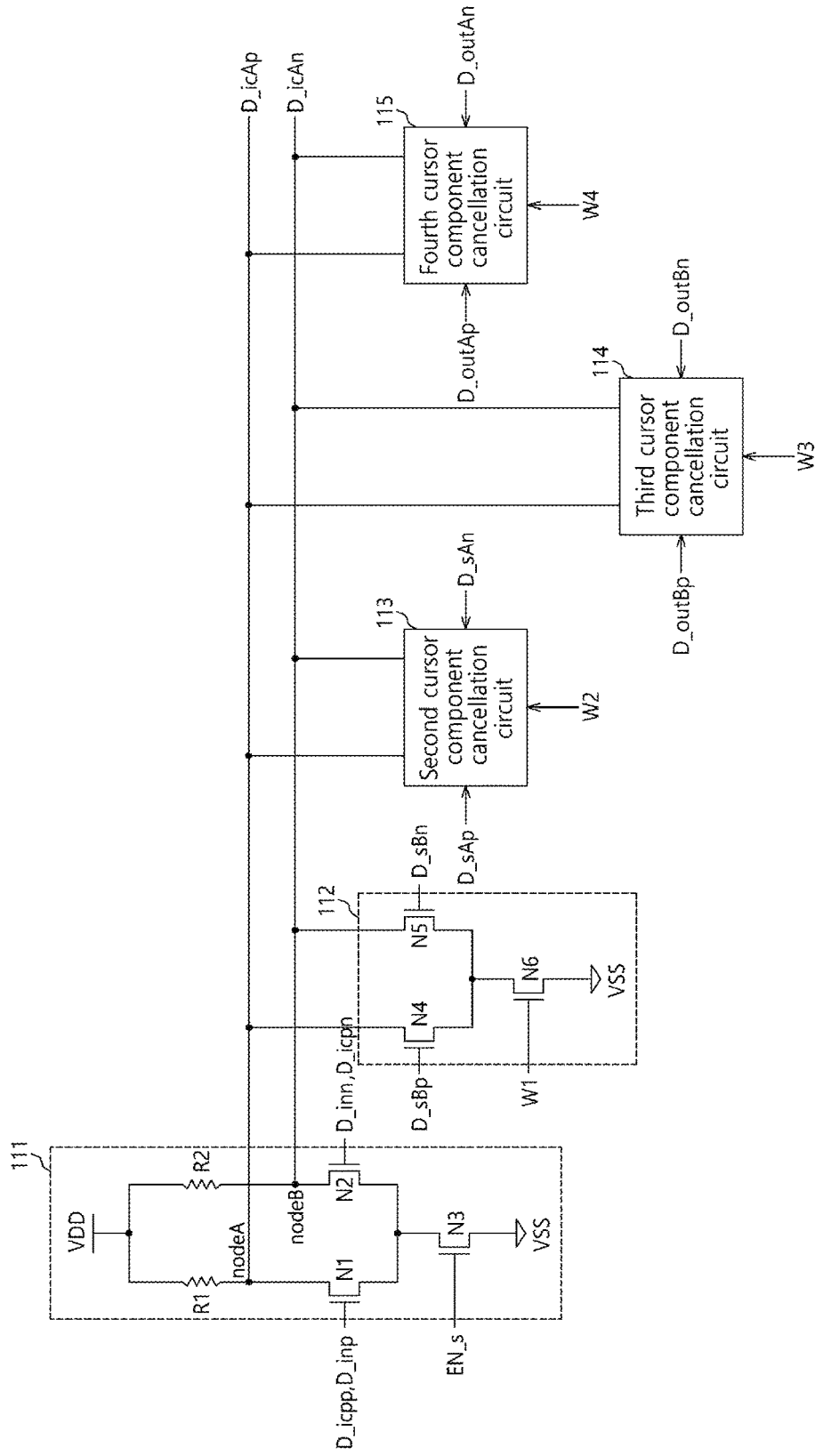
FIG. 3 is a configuration diagram illustrating a representation of an example of the first interference cancellation circuit of FIG. 2.

Referring to FIG. 3, the first interference cancellation circuit 110 may include a buffer 111, and first to fourth cursor component cancellation circuits 112, 113, 114 and 115. The input signal D_in may be a differential signal which includes a positive input signal D_inp and a negative input signal D_inn.

The buffer 111 may buffer the positive input signal D_inp and the negative input signal D_inn, and the first to fourth cursor component cancellation circuits 112, 113, 114 and 115 may cancel the first to fourth post cursor components of the signals outputted from the buffer 111. For example, the first cursor component cancellation circuit 112 may cancel the first post cursor component. The second cursor component cancellation circuit 113 may cancel the second post cursor component. The third cursor component cancellation circuit 114 may cancel the third post cursor component. The fourth cursor component cancellation circuit 115 may cancel the fourth post cursor component.

The buffer 111 may include first and second resistors R1 and R2, first to third transistors N1, N2 and N3, and first and second output terminals node A and node B. The first resistor R1 has one end which is applied with an external voltage VDD and another end coupled to the first output terminal node A. The second resistor R2 has one end which is applied with the external voltage VDD and another end coupled to the second output terminal node B. The first transistor N1 has a gate which is inputted with the positive input signal D_inp and a drain to which the other end of the first resistor R1 is coupled. The second transistor N2 has a gate which is inputted with the negative input signal D_inn and a drain to which the other end of the second resistor R2 is coupled. The third transistor N3 has a gate which is inputted with an enable signal EN_s, a drain to which a node to which sources of the first and second transistors N1 and N2 are coupled is coupled, and a source to which a ground terminal VSS is coupled. A first positive interference-cancelled signal D_icAp is outputted from a node to which the first resistor R1 and the first transistor N1 are coupled, and a first negative interference-cancelled signal D_icAn is outputted from a node to which the second resistor R2 and the second transistor N2 are coupled. The first interference-cancelled signal D_icA may be a differential signal. The first interference-cancelled signal D_icA as a differential signal may include the first positive interference-cancelled signal D_icAp and the first negative interference-cancelled signal D_icAn.

The first cursor component cancellation circuit 112 may include fourth to sixth transistors N4, N5 and N6. The fourth transistor N4 has a gate which is inputted with a second positive sampling signal D_sBp and a drain to which the node from which the first positive interference-cancelled signal D_icAp is outputted is coupled. The fifth transistor N5 has a gate which is inputted with a second negative sampling signal D_sBn and a drain to which the node from which the first negative interference-cancelled signal D_icAn is outputted is coupled. The sixth transistor N6 has a gate which is inputted with the first weight application signal W1, a drain to which sources of the fourth and fifth transistors N4 and N5 are coupled, and a source to which the ground terminal VSS is coupled. The second sampling signal D_sB may be a differential signal. The second sampling signal D_sB as a differential signal may include the second positive sampling signal D_sBp and the second negative sampling signal D_sBn.

The second to fourth cursor component cancellation circuits 113, 114 and 115 may also be configured in the same manner as the first cursor component cancellation circuit 112. The first sampling signal D_sA may be a differential signal. The first sampling signal D_sA as a differential signal may include a first positive sampling signal D_sAp and a first negative sampling signal D_sAn. The first output signal D_outA may be a differential signal. The first output signal D_outA as a differential signal may include a first positive output signal D_outAp and a first negative output signal D_outAn. The second output signal D_outB may be a differential signal. The second output signal D_outB as a differential signal may include a second positive output signal D_outBp and a second negative output signal D_outBn.

The first to fourth cursor component cancellation circuits 112, 113, 114 and 115 configured as mentioned above may determine amounts of sink currents to be flowed to the ground terminal VSS according to the voltage levels of the respective weight application signals W1, W2, W3 and W4 inputted thereto. The first to fourth cursor component cancellation circuits 112, 113, 114 and 115 may determine the cancellation timings of the first to fourth post cursor components by flowing the sink currents to the ground terminal VSS in response to the first and second sampling signals D_sA and D_sB and the first and second output signals D_outA and D_outB which are fed back.

The symbol interference cancellation circuit in accordance with an embodiment, configured as mentioned above, may operate as follows.

The input signal D_in is inputted to the first and second interference cancellation circuits 110 and 120.

The first and second interference cancellation circuits 110 and 120 may cancel interferences between the symbols of the input signal D_in in response to the first and second sampling signals D_sA and D_sB, the first and second output signals D_outA and D_outB and the first to fourth weight application signals W1, W2, W3 and W4, and generate the first and second interference-cancelled signals D_icA and D_icB which are cancelled with the interferences.

For example, the first interference cancellation circuit 110 may cancel the first post cursor component of the input signal D_in which is inputted to the first interference cancellation circuit 110, in response to the second sampling signal D_sB and the first weight application signal W1. The first interference cancellation circuit 110 may cancel the second post cursor component of the input signal D_in which is inputted to the first interference cancellation circuit 110, in response to the first sampling signal D_sA and the second weight application signal W2. The first interference cancellation circuit 110 may cancel the third post cursor component of the input signal D_in which is inputted to the first-first interference cancellation circuit 110, in response to the second output signal D_outB and the third weight application signal W3. The first interference cancellation circuit 110 may cancel the fourth post cursor component of the input signal D_in which is inputted to the first interference cancellation circuit 110, in response to the first output signal D_outA and the fourth weight application signal W4. The second interference cancellation circuit 120 may cancel the first post cursor component of the input signal D_in which is inputted to the second interference cancellation circuit 120, in response to the first sampling signal D_sA and the first weight application signal W1. The second interference cancellation circuit 120 may cancel the second post cursor component of the input signal D_in which is inputted to the second interference cancellation circuit 120, in response to the second sampling signal D_sB and the second weight application signal W2. The second interference cancellation circuit 120 may cancel the third post cursor component of the input signal D_in which is inputted to the second interference cancellation circuit 120, in response to the first output signal D_outA and the third weight application signal W3. The second interference cancellation circuit 120 may cancel the fourth post cursor component of the input signal D_in which is inputted to the second interference cancellation circuit 120, in response to the second output signal D_outB and the fourth weight application signal W4. The weight control circuit 400 may output the first to fourth weight application signals W1, W2, W3 and W4 of which voltage levels are determined according to information on interferences between symbols. The weight control circuit 400 may determine the voltage levels of the first to fourth weight application signals W1, W2, W3 and W4 according to the interference amounts of the first to fourth post cursor components, and store the first to fourth weight application signals W1, W2, W3 and W4 of the determined voltage levels.

The first sampling circuit 210 may sample the first interference-cancelled signal D_icA in response to the clock CLK signal, and output a sampled signal as the first sampling signal D_sA.

The second sampling circuit 220 may sample the second interference-cancelled signal D_icB in response to the clock CLK signal, and output a sampled signal as the second sampling signal D_sB.

The first shift register 310 may shift the first sampling signal D_sA by the predetermined cycle (for example, 1 cycle) of the clock CLK signal, and output the first output signal D_outA.

The second shift register 320 may shift the second sampling signal D_sB by the predetermined cycle (for example, 1 cycle) of the clock CLK signal, and output the second output signal D_outB.

As in the above operation, the symbol interference cancellation circuit in accordance with an embodiment may cancel interferences between symbols in response to weight application signals having size information of symbol interferences and feedback signals (sampling signals and output signals) having timing information of the symbol interferences. In this regard, a problem may be caused in that a timing margin when cancelling the third post cursor components in response to the output signals finally outputted among the feedback signals may be insufficient.

Figure 4:
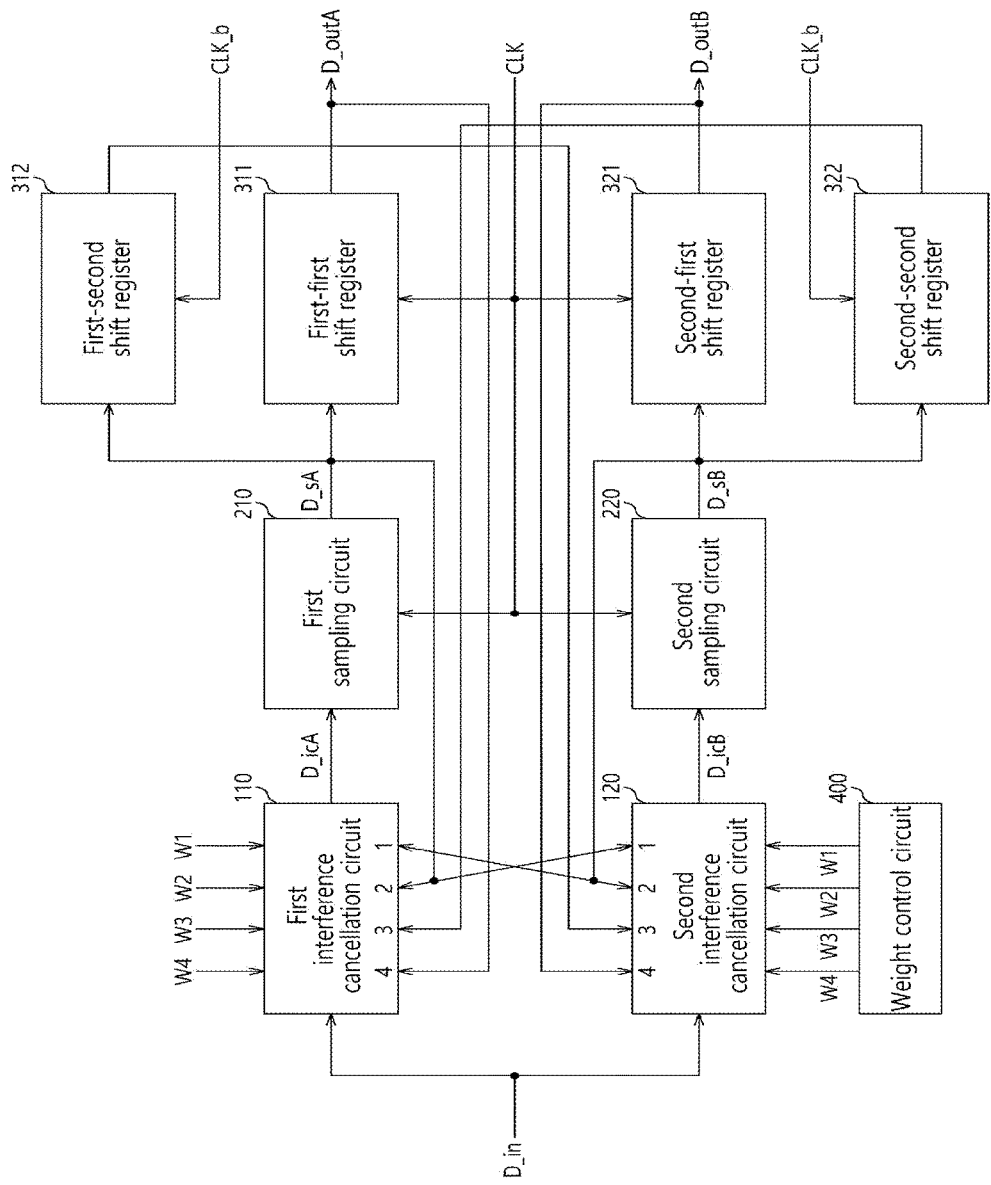
FIG. 4 is a configuration diagram illustrating a representation of an example of a symbol interference cancellation circuit in accordance an embodiment.

Referring to FIG. 4, a symbol interference cancellation circuit in accordance with an embodiment may include first and second interference cancellation circuits 110 and 120, first and second sampling circuits 210 and 220, a first-first shift register 311, a first-second shift register 312, a second-first shift register 321, a second-second shift register 322, and a weight control circuit 400.

The first interference cancellation circuit 110 may generate a first interference-cancelled signal D_icA by cancelling the first to fourth post cursor components of the input signal D_in inputted to the first interference cancellation circuit 110, in response to first to fourth weight application signals W1, W2, W3 and W4, first and second sampling signals D_sA and D_sB and the output signals of the shift registers 311 and 322. For example, the first interference cancellation circuit 110 may cancel the first post cursor component in response to the second sampling signal D_sB inputted to a first input terminal 1 and the first weight application signal W1. The first interference cancellation circuit 110 may cancel the second post cursor component in response to the first sampling signal D_sA inputted to a second input terminal 2 and the second weight application signal W2. The first interference cancellation circuit 110 may cancel the third post cursor component in response to the output signal of the second-second shift register 322 inputted to a third input terminal 3 and the third weight application signal W3. The first interference cancellation circuit 110 may cancel the fourth post cursor component in response to the output signal of the first-first shift register 311, that is, a first output signal D_outA, inputted to a fourth input terminal 4 and the fourth weight application signal W4. The first and second sampling signals D_sA and D_sB and the output signals of the shift registers 311 and 322 inputted to the first to fourth input terminals 1 to 4 of the first interference cancellation circuit 110 may include cancellation timings of cursor components, and the first to fourth weight application signals W1, W2, W3 and W4 may include amounts of the cursor components to be cancelled.

The first sampling circuit 210 may sample the first interference-cancelled signal D_icA in response to a clock CLK signal, and output a sampling result as the first sampling signal D_sA. The first sampling circuit 210 may be embodied by a latch type sense amplifier.

The first-first shift register 311 may shift the first sampling signal D_sA by a predetermined cycle of the clock CLK signal, and output the first output signal D_outA. The first-first shift register 311 may be embodied by a flip-flop.

The first-second shift register 312 may shift the first sampling signal D_sA by a predetermined cycle of a clock bar CLK_b signal which has a phase opposite to the clock CLK signal, and output the output signal. The first-second shift register 312 may be embodied by a flip-flop.

The second interference cancellation circuit 120 may generate a second interference-cancelled signal D_icB by cancelling the first to fourth post cursor components of the input signal D_in inputted to the second interference cancellation circuit 120, in response to the first to fourth weight application signals W1, W2, W3 and W4, the first and second sampling signals D_sA and D_sB and the output signals of the shift registers 312 and 321. For example, the second interference cancellation circuit 120 may cancel the first post cursor component in response to the first sampling signal D_sA inputted to a first input terminal 1 and the first weight application signal W1. The second interference cancellation circuit 120 may cancel the second post cursor component in response to the second sampling signal D_sB inputted to a second input terminal 2 and the second weight application signal W2. The second interference cancellation circuit 120 may cancel the third post cursor component in response to the output signal of the first-second shift register 312 inputted to a third input terminal 3 and the third weight application signal W3. The second interference cancellation circuit 120 may cancel the fourth post cursor component in response to the output signal of the second-first shift register 321, that is, a second output signal D_outB, inputted to a fourth input terminal 4 and the fourth weight application signal W4. The first and second sampling signals D_sA and D_sB and the output signals of the shift registers 312 and 321 inputted to the first to fourth input terminals 1 to 4 of the second interference cancellation circuit 120 may include cancellation timings of cursor components, and the first to fourth weight application signals W1, W2, W3 and W4 may include amounts of the cursor components to be cancelled. While the first interference cancellation circuit 110 and the second interference cancellation circuit 120 are inputted with the input signal D_in, the input signal D_in may be a differential signal, and the first and second interference cancellation circuits 110 and 120, the first and second sampling circuits 210 and 220 and the first-first, first-second, second-first and second-second shift registers 311, 312, 321 and 322 may be embodied by differential circuits.

The second sampling circuit 220 may sample the second interference-cancelled signal D_icB in response to the clock CLK signal, and output a sampling result as the second sampling signal D_sB. The second sampling circuit 220 may be embodied by a latch type sense amplifier.

The second-first shift register 321 may shift the second sampling signal D_sB by a predetermined cycle of the clock CLK signal, and output the second output signal D_outB. The second-first shift register 321 may be embodied by a flip-flop.

The second-second shift register 322 may shift the second sampling signal D_sB by a predetermined cycle of the clock bar CLK_b signal which has a phase opposite to the clock CLK signal, and output the output signal. The second-second shift register 322 may be embodied by a flip-flop.

The weight control circuit 400 may store respective information of the first to fourth weight application signals W1, W2, W3 and W4, and determine and output the voltage levels of the first to fourth weight application signals W1, W2, W3 and W4 according to the information.

Referring to FIG. 3, the first interference cancellation circuit 110 may include a buffer 111, and first to fourth cursor component cancellation circuits 112, 113, 114 and 115. Since configurations of the buffer 111 and the first to fourth cursor component cancellation circuits 112, 113, 114 and 115 are described above, descriptions thereof will be omitted herein.

The first to fourth cursor component cancellation circuits 112, 113, 114 and 115 may determine amounts of sink currents to be flowed to the ground terminal VSS according to the voltage levels of the respective weight application signals W1, W2, W3 and W4 inputted thereto. The first to fourth cursor component cancellation circuits 112, 113, 114 and 115 may determine the cancellation timings of the first to fourth post cursor components by flowing the sink currents to the ground terminal VSS in response to the first and second sampling signals D_sA and D_sB and the output signals of the shift registers 311, 312, 321 and 322 which are fed back.

The symbol interference cancellation circuit in accordance with an embodiment, configured as mentioned above, may operate as follows.

The input signal D_in is inputted to the first and second interference cancellation circuits 110 and 120.

The first and second interference cancellation circuits 110 and 120 may cancel interferences between the symbols of the input signal D_in in response to the first and second sampling signals D_sA and D_sB, the output signals of the shift registers 311, 312, 321 and 322 and the first to fourth weight application signals W1, W2, W3 and W4, and generate the first and second interference-cancelled signals D_icA and D_icB which are cancelled with the interferences.

The first interference cancellation circuit 110 may cancel the first post cursor component of the input signal D_in which is inputted to the first interference cancellation circuit 110, in response to the second sampling signal D_sB and the first weight application signal W1. The first interference cancellation circuit 110 may cancel the second post cursor component of the input signal D_in which is inputted to the first interference cancellation circuit 110, in response to the first sampling signal D_sA and the second weight application signal W2. The first interference cancellation circuit 110 may cancel the third post cursor component of the input signal D_in which is inputted to the first interference cancellation circuit 110, in response to the output signal of the second-second shift register 322 and the third weight application signal W3. The first interference cancellation circuit 110 may cancel the fourth post cursor component of the input signal D_in which is inputted to the first interference cancellation circuit 110, in response to the output signal of the first-first shift register 311, that is, the first output signal D_outA, and the fourth weight application signal W4. The second interference cancellation circuit 120 may cancel the first post cursor component of the input signal D_in which is inputted to the second interference cancellation circuit 120, in response to the first sampling signal D_sA and the first weight application signal W1. The second interference cancellation circuit 120 may cancel the second post cursor component of the input signal D_in which is inputted to the second interference cancellation circuit 120, in response to the second sampling signal D_sB and the second weight application signal W2. The second interference cancellation circuit 120 may cancel the third post cursor component of the input signal D_in which is inputted to the second interference cancellation circuit 120, in response to the output signal of the first-second shift register 312 and the third weight application signal W3. The second interference cancellation circuit 120 may cancel the fourth post cursor component of the input signal D_in which is inputted to the second interference cancellation circuit 120, in response to the output signal of the second-first shift register 321, that is, the second output signal D_outB, and the fourth weight application signal W4. The weight control circuit 400 may output the first to fourth weight application signals W1, W2, W3 and W4 of which voltage levels are determined according to information on interferences between symbols. The weight control circuit 400 may determine the voltage levels of the first to fourth weight application signals W1, W2, W3 and W4 according to the interference amounts of the first to fourth post cursor components, and store the first to fourth weight application signals W1, W2, W3 and W4 of the determined voltage levels.

The first sampling circuit 210 may sample the first interference-cancelled signal D_icA in response to the clock CLK signal, and output a sampled signal as the first sampling signal D_sA.

The second sampling circuit 220 may sample the second interference-cancelled signal D_icB in response to the clock CLK signal, and output a sampled signal as the second sampling signal D_sB.

The first-first shift register 311 may shift the first sampling signal D_sA by the predetermined cycle (for example, 1 cycle) of the clock CLK signal, and output the first output signal D_outA.

The first-second shift register 312 may shift the first sampling signal D_sA by the predetermined cycle (for example, 1 cycle) of the clock bar CLK_b signal, and output the output signal.

The second-first shift register 321 may shift the second sampling signal D_sB by the predetermined cycle (for example, 1 cycle) of the clock CLK signal, and output the second output signal D_outB.

The second-second shift register 322 may shift the second sampling signal D_sB by the predetermined cycle (for example, 1 cycle) of the clock bar CLK_b signal, and output the output signal.

The symbol interference cancellation circuit according to an embodiment illustrated in FIG. 4 is different from the symbol interference cancellation circuit according to an embodiment illustrated in FIG. 2 in terms of cancellation timing of the third post cursor component. In a present embodiment, the first and second sampling signals D_sA and D_sB are shifted by using the clock bar CLK_b signal which is faster by one half cycle than the clock CLK signal, and the shifted first and second sampling signals D_sA and D_sB are used in cancelling the third post cursor component. As a consequence, in the symbol interference cancellation circuit according to an embodiment illustrated in FIG. 4, when compared to the symbol interference cancellation circuit according to an embodiment illustrated in FIG. 2, a timing for cancelling the third post cursor component may be advanced by the half cycle of the clock CLK signal, and thus, it may be possible to increase the response speed of the symbol interference cancellation circuit.

Figure 5:
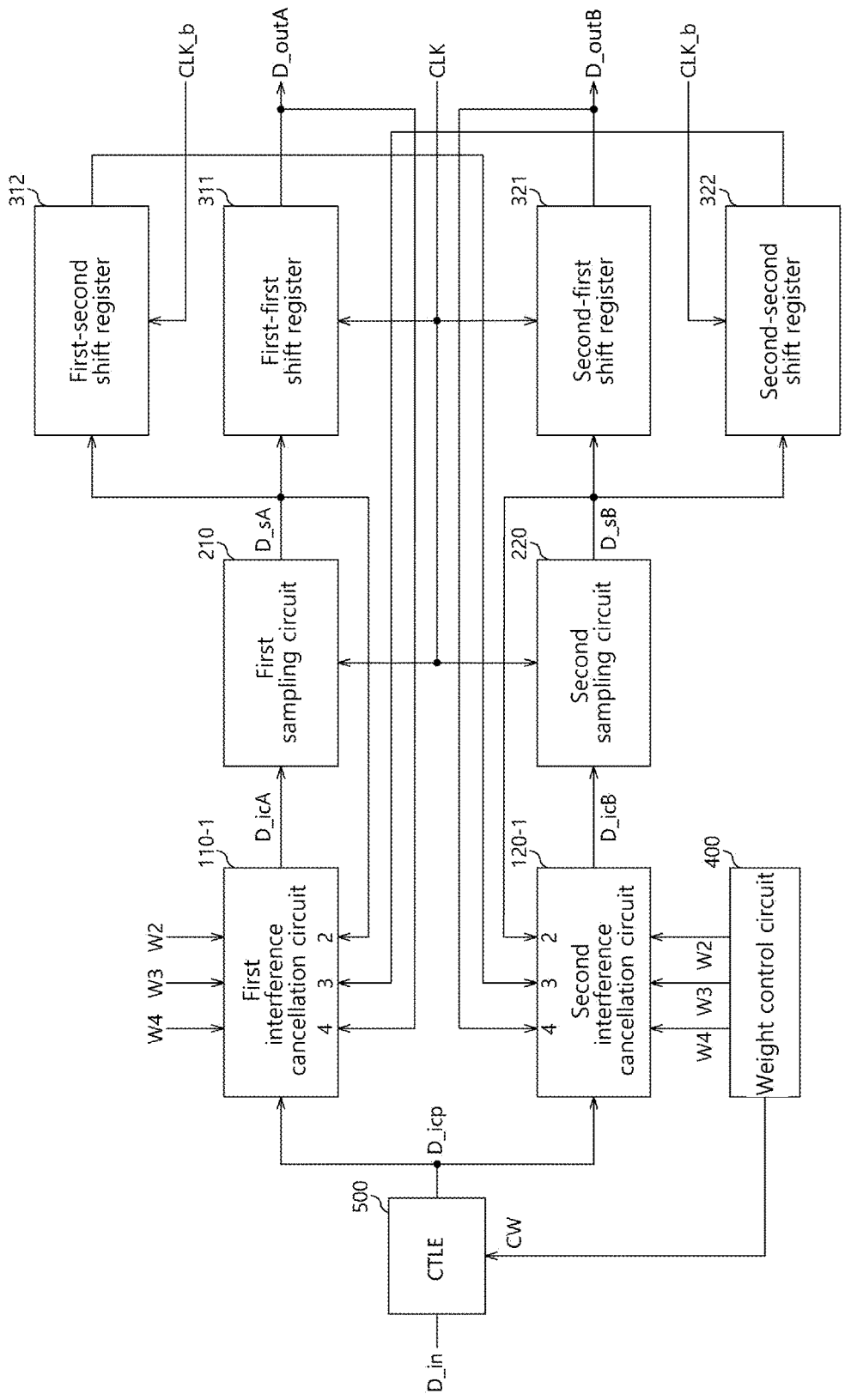
FIG. 5 is a configuration diagram illustrating a representation of an example of a symbol interference cancellation circuit in accordance an embodiment.

Referring to FIG. 5, a symbol interference cancellation circuit in accordance with an embodiment may include first and second interference cancellation circuits 110-1 and 120-1, first and second sampling circuits 210 and 220, a first-first shift register 311, a first-second shift register 312, a second-first shift register 321, a second-second shift register 322, a weight control circuit 400, and a CTLE (continuous time linear equalizer) 500.

The CTLE 500 may be inputted with the input signal D_in, cancel the first post cursor component of the input signal D_in in response to a first weight application signal CW, and output the input signal D_in cancelled with the first post cursor component as a pre-interference-cancelled signal D_icp.

The first interference cancellation circuit 110-1 may generate a first interference-cancelled signal D_icA by cancelling the second to fourth post cursor components of the pre-interference-cancelled signal D_icp inputted to the first interference cancellation circuit 110-1, in response to second to fourth weight application signals W2, W3 and W4, a first sampling signal D_sA and the output signals of the shift registers 311 and 322. For example, the first interference cancellation circuit 110-1 may cancel the second post cursor component in response to the first sampling signal D_sA inputted to a second input terminal 2 and the second weight application signal W2. The first interference cancellation circuit 110-1 may cancel the third post cursor component in response to the output signal of the second-second shift register 322 inputted to a third input terminal 3 and the third weight application signal W3. The first interference cancellation circuit 110-1 may cancel the fourth post cursor component in response to the output signal of the first-first shift register 311, that is, a first output signal D_outA, inputted to a fourth input terminal 4 and the fourth weight application signal W4. The first sampling signal D_sA and the output signals of the shift registers 311 and 322 inputted to the second to fourth input terminals 2 to 4 of the first interference cancellation circuit 110-1 may include cancellation timings of cursor components, and the second to fourth weight application signals W2, W3 and W4 may include amounts of the cursor components to be cancelled.

The first sampling circuit 210 may sample the first interference-cancelled signal D_icA in response to a clock CLK signal, and output a sampling result as the first sampling signal D_sA. The first sampling circuit 210 may be embodied by a latch type sense amplifier.

The first-first shift register 311 may shift the first sampling signal D_sA by a predetermined cycle of the clock CLK signal, and output the first output signal D_outA. The first-first shift register 311 may be embodied by a flip-flop.

The first-second shift register 312 may shift the first sampling signal D_sA by a predetermined cycle of a clock bar CLK_b signal which has a phase opposite to the clock CLK signal, and output the output signal. The first-second shift register 312 may be embodied by a flip-flop.

The second interference cancellation circuit 120-1 may generate a second interference-cancelled signal D_icB by cancelling the second to fourth post cursor components of the pre-interference-cancelled signal D_icp inputted to the second interference cancellation circuit 120-1, in response to the second to fourth weight application signals W2, W3 and W4, a second sampling signal D_sB and the output signals of the shift registers 312 and 321. For example, the second interference cancellation circuit 120-1 may cancel the second post cursor component in response to the second sampling signal D_sB inputted to a second input terminal 2 and the second weight application signal W2. The second interference cancellation circuit 120-1 may cancel the third post cursor component in response to the output signal of the first-second shift register 312 inputted to a third input terminal 3 and the third weight application signal W3. The second interference cancellation circuit 120-1 may cancel the fourth post cursor component in response to the output signal of the second-first shift register 321, that is, a second output signal D_outB, inputted to a fourth input terminal 4 and the fourth weight application signal W4. The second sampling signal D_sB and the output signals of the shift registers 312 and 321 inputted to the second to fourth input terminals 2 to 4 of the second interference cancellation circuit 120-1 may include cancellation timings of cursor components, and the second to fourth weight application signals W2, W3 and W4 may include amounts of the cursor components to be cancelled. While the first interference cancellation circuit 110-1 and the second interference cancellation circuit 120-1 are inputted with the pre-interference-cancelled signal D_icp, the pre-interference-cancelled signal D_icp may be a differential signal, and the first and second interference cancellation circuits 110-1 and 120-1, the first and second sampling circuits 210 and 220 and the first-first, first-second, second-first and second-second shift registers 311, 312, 321 and 322 may be embodied by differential circuits.

The second sampling circuit 220 may sample the second interference-cancelled signal D_icB in response to the clock CLK signal, and output a sampling result as the second sampling signal D_sB. The second sampling circuit 220 may be embodied by a latch type sense amplifier.

The second-first shift register 321 may shift the second sampling signal D_sB by a predetermined cycle of the clock CLK signal, and output the second output signal D_outB. The second-first shift register 321 may be embodied by a flip-flop.

The second-second shift register 322 may shift the second sampling signal D_sB by a predetermined cycle of the clock bar CLK_b signal which has a phase opposite to the clock CLK signal, and output the output signal. The second-second shift register 322 may be embodied by a flip-flop.

The weight control circuit 400 may store respective information of the first to fourth weight application signals W1, W2, W3 and W4, and determine and output the voltage levels of the first to fourth weight application signals W1, W2, W3 and W4 according to the information.

The first interference cancellation circuit 110-1 may be embodied by excluding the first cursor component cancellation circuit 112 among the components configuring the first interference cancellation circuit 110 illustrated in FIG. 3, that is, the buffer 111 and the first to fourth cursor component cancellation circuits 112, 113, 114 and 115. Since configurations of the buffer 111 and the second to fourth cursor component cancellation circuits 113, 114 and 115 are described above, descriptions thereof will be omitted herein. In an embodiment, for example, a gate of the first transistor N1 of the buffer 111 may be configured to receive the pre-interference-cancelled signal D_icp (i.e., a positive pre-interference-cancelled signal D_icpp, see FIG. 3). In an embodiment, for example, a gate of the second transistor N2 of the buffer 111 may be configured to receive the pre-interference-cancelled signal D_icp (i.e., a negative pre-interference-cancelled signal D_icpn, see FIG. 3). In an embodiment, for example, the pre-interference-cancelled signal D_icp may be a differential signal which includes a positive pre-interference-cancelled signal D_icpp and a negative pre-interference-cancelled signal D_icpn.

The second to fourth cursor component cancellation circuits 113, 114 and 115 may determine amounts of sink currents to be flowed to the ground terminal VSS according to the voltage levels of the respective weight application signals W2, W3 and W4 inputted thereto. The second to fourth cursor component cancellation circuits 113, 114 and 115 may determine the cancellation timings of the second to fourth post cursor components by flowing the sink currents to the ground terminal VSS in response to the first sampling signal D_sA and the output signals of the shift registers 311 and 322 which are fed back.

The symbol interference cancellation circuit in accordance with an embodiment, configured as mentioned above, may operate as follows.

The input signal D_in is inputted to the CTLE 500, is cancelled with the first post cursor component, and is outputted as the pre-interference-cancelled signal D_icp. The pre-interference-cancelled signal D_icp is inputted to the first and second interference cancellation circuits 110-1 and 120-1.

The first and second interference cancellation circuits 110-1 and 120-1 may cancel interferences between the symbols of the pre-interference-cancelled signal D_icp in response to the first and second sampling signals D_sA and D_sB, the output signals of the shift registers 311, 312, 321 and 322 and the second to fourth weight application signals W2, W3 and W4, and generate the first and second interference-cancelled signals D_icA and D_icB which are cancelled with the interferences.

The first interference cancellation circuit 110-1 may cancel the second post cursor component of the pre-interference-cancelled signal D_icp which is inputted to the first interference cancellation circuit 110-1, in response to the first sampling signal D_sA and the second weight application signal W2. The first interference cancellation circuit 110-1 may cancel the third post cursor component of the pre-interference-cancelled signal D_icp which is inputted to the first interference cancellation circuit 110-1, in response to the output signal of the second-second shift register 322 and the third weight application signal W3. The first interference cancellation circuit 110-1 may cancel the fourth post cursor component of the pre-interference-cancelled signal D_icp which is inputted to the first interference cancellation circuit 110-1, in response to the output signal of the first-first shift register 311, that is, the first output signal D_outA, and the fourth weight application signal W4. The second interference cancellation circuit 120-1 may cancel the second post cursor component of the pre-interference-cancelled signal D_icp which is inputted to the second interference cancellation circuit 120-1, in response to the second sampling signal D_sB and the second weight application signal W2. The second interference cancellation circuit 120-1 may cancel the third post cursor component of the pre-interference-cancelled signal D_icp which is inputted to the second interference cancellation circuit 120-1, in response to the output signal of the first-second shift register 312 and the third weight application signal W3. The second interference cancellation circuit 120-1 may cancel the fourth post cursor component of the pre-interference-cancelled signal D_icp which is inputted to the second interference cancellation circuit 120-1, in response to the output signal of the second-first shift register 321, that is, the second output signal D_outB, and the fourth weight application signal W4. The weight control circuit 400 may output the first to fourth weight application signals CW, W2, W3 and W4 of which voltage levels are determined according to information on interferences between symbols. The weight control circuit 400 may determine the voltage levels of the first to fourth weight application signals CW, W2, W3 and W4 according to the interference amounts of the first to fourth post cursor components, and store the first to fourth weight application signals CW, W2, W3 and W4 of the determined voltage levels.

The first sampling circuit 210 may sample the first interference-cancelled signal D_icA in response to the clock CLK signal, and output a sampled signal as the first sampling signal D_sA.

The second sampling circuit 220 may sample the second interference-cancelled signal D_icB in response to the clock CLK signal, and output a sampled signal as the second sampling signal D_sB.

The first-first shift register 311 may shift the first sampling signal D_sA by the predetermined cycle (for example, 1 cycle) of the clock CLK signal, and output the first output signal D_outA.

The first-second shift register 312 may shift the first sampling signal D_sA by the predetermined cycle (for example, 1 cycle) of the clock bar CLK_b signal, and output the output signal.

The second-first shift register 321 may shift the second sampling signal D_sB by the predetermined cycle (for example, 1 cycle) of the clock CLK signal, and output the second output signal D_outB.

The second-second shift register 322 may shift the second sampling signal D_sB by the predetermined cycle (for example, 1 cycle) of the clock bar CLK_b signal, and output the output signal.

The symbol interference cancellation circuit according to an embodiment illustrated in FIG. 5 is different from the symbol interference cancellation circuit according to an embodiment illustrated in FIG. 2 in terms of cancellation timing of the third post cursor component. In a present embodiment, the first and second sampling signals D_sA and D_sB are shifted by using the clock bar CLK_b signal which is faster by one half cycle than the clock CLK signal, and the shifted first and second sampling signals D_sA and D_sB are used in cancelling the third post cursor component. As a consequence, in the symbol interference cancellation circuit according to an embodiment illustrated in FIG. 5, when compared to the symbol interference cancellation circuit according to an embodiment illustrated in FIG. 2, a timing for cancelling the third post cursor component may be advanced by the half cycle of the clock CLK signal, and thus, it may be possible to increase the response speed of the symbol interference cancellation circuit.

Figure 6:
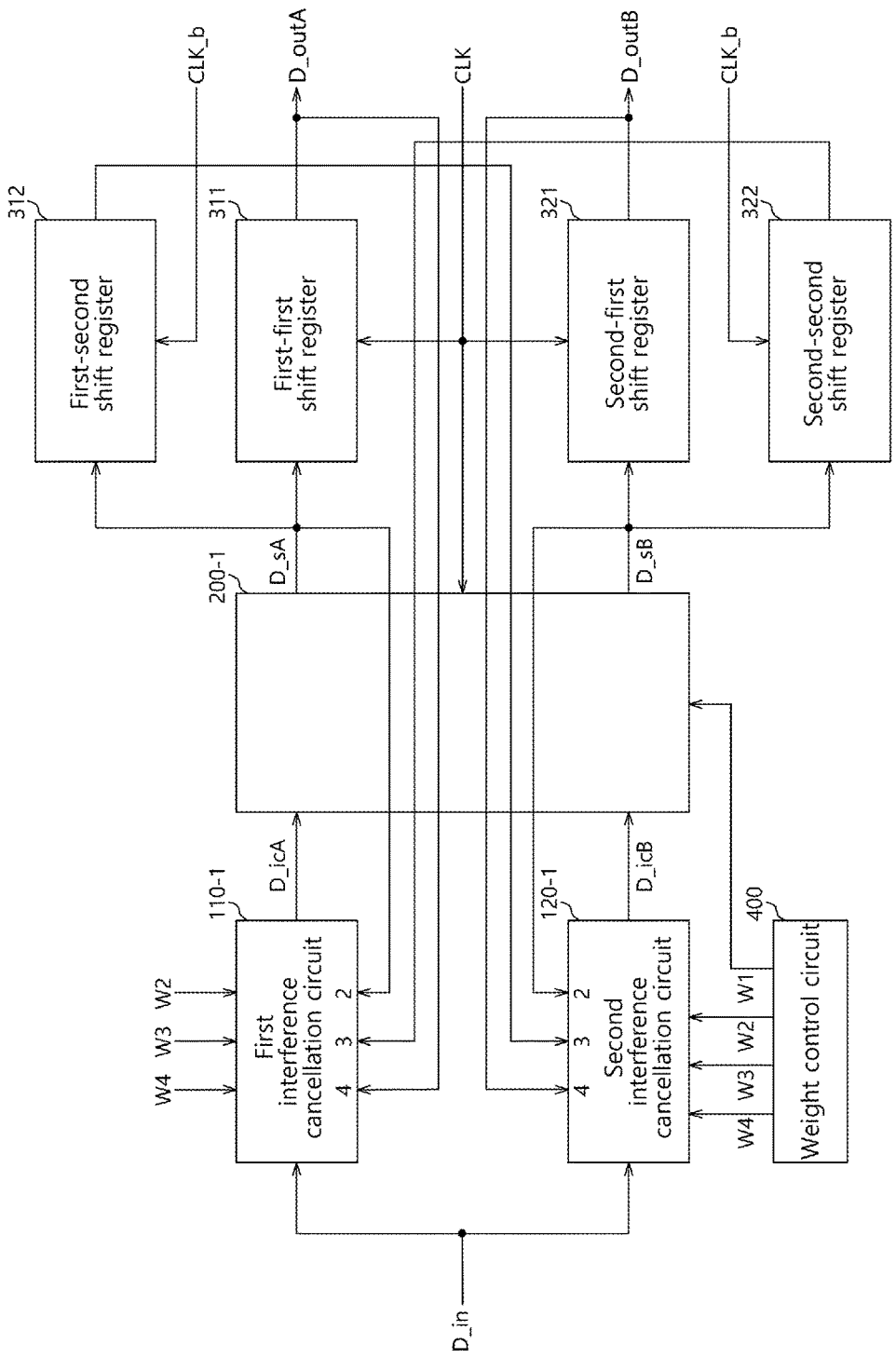
FIG. 6 is a configuration diagram illustrating a representation of an example of a symbol interference cancellation circuit in accordance an embodiment.

Referring to FIG. 6, a symbol interference cancellation circuit in accordance with an embodiment may include first and second interference cancellation circuits 110-1 and 120-1, a sampling circuit 200-1, a first-first shift register 311, a first-second shift register 312, a second-first shift register 321, a second-second shift register 322, and a weight control circuit 400.

The first interference cancellation circuit 110-1 may generate a first interference-cancelled signal D_icA by cancelling the second to fourth post cursor components of the input signal D_in inputted to the first interference cancellation circuit 110-1, in response to second to fourth weight application signals W2, W3 and W4, a first sampling signal D_sA and the output signals of the shift registers 311 and 322. For example, the first interference cancellation circuit 110-1 may cancel the second post cursor component in response to the first sampling signal D_sA inputted to a second input terminal 2 and the second weight application signal W2. The first interference cancellation circuit 110-1 may cancel the third post cursor component in response to the output signal of the second-second shift register 322 inputted to a third input terminal 3 and the third weight application signal W3. The first interference cancellation circuit 110-1 may cancel the fourth post cursor component in response to the output signal of the first-first shift register 311, that is, a first output signal D_outA, inputted to a fourth input terminal 4 and the fourth weight application signal W4. The first sampling signal D_sA and the output signals of the shift registers 311 and 322 inputted to the second to fourth input terminals 2 to 4 of the first interference cancellation circuit 110-1 may include cancellation timings of cursor components, and the second to fourth weight application signals W2, W3 and W4 may include amounts of the cursor components to be cancelled.

The sampling circuit 200-1 may cancel the first post cursor component of the first interference-cancelled signal D_icA in response to a first weight application signal W1 and a clock CLK signal, sample the first interference-cancelled signal D_icA cancelled with the first post cursor component, in response to the clock CLK signal, and output a sampling result as the first sampling signal D_sA. The sampling circuit 200-1 may cancel the first post cursor component of a second interference-cancelled signal D_icB in response to the first weight application signal W1 and the clock CLK signal, and output the second interference-cancelled signal D_icB cancelled with the first post cursor component as a second sampling signal D_sB. The sampling circuit 200-1 may be configured by a combination of the sampling circuit 210 illustrated in FIG. 2 and the first cursor component cancellation circuit 112 illustrated in FIG. 3, and may be embodied by a 1-tap loop-unrolling DFE (decision feedback equalizer).

The first-first shift register 311 may shift the first sampling signal D_sA by a predetermined cycle of the clock CLK signal, and output the first output signal D_outA. The first-first shift register 311 may be embodied by a flip-flop.

The first-second shift register 312 may shift the first sampling signal D_sA by a predetermined cycle of a clock bar CLK_b signal which has a phase opposite to the clock CLK signal, and output the output signal. The first-second shift register 312 may be embodied by a flip-flop.

The second interference cancellation circuit 120-1 may generate the second interference-cancelled signal D_icB by cancelling the second to fourth post cursor components of the input signal D_in inputted to the second interference cancellation circuit 120-1, in response to the second to fourth weight application signals W2, W3 and W4, the second sampling signal D_sB and the output signals of the shift registers 312 and 321. For example, the second interference cancellation circuit 120-1 may cancel the second post cursor component in response to the second sampling signal D_sB inputted to a second input terminal 2 and the second weight application signal W2. The second interference cancellation circuit 120-1 may cancel the third post cursor component in response to the output signal of the first-second shift register 312 inputted to a third input terminal 3 and the third weight application signal W3. The second interference cancellation circuit 120-1 may cancel the fourth post cursor component in response to the output signal of the second-first shift register 321, that is, a second output signal D_outB, inputted to a fourth input terminal 4 and the fourth weight application signal W4. The second sampling signal D_sB and the output signals of the shift registers 312 and 321 inputted to the second to fourth input terminals 2 to 4 of the second interference cancellation circuit 120-1 may include cancellation timings of cursor components, and the second to fourth weight application signals W2, W3 and W4 may include amounts of the cursor components to be cancelled. While the first interference cancellation circuit 110-1 and the second interference cancellation circuit 120-1 are inputted with the input signal D_in, the input signal D_in may be a differential signal, and the first and second interference cancellation circuits 110-1 and 120-1, the sampling circuit 200-1 and the first-first, first-second, second-first and second-second shift registers 311, 312, 321 and 322 may be embodied by differential circuits.

The second-first shift register 321 may shift the second sampling signal D_sB by a predetermined cycle of the clock CLK signal, and output the second output signal D_outB. The second-first shift register 321 may be embodied by a flip-flop.

The second-second shift register 322 may shift the second sampling signal D_sB by a predetermined cycle of the clock bar CLK_b signal which has a phase opposite to the clock CLK signal, and output the output signal. The second-second shift register 322 may be embodied by a flip-flop.

The weight control circuit 400 may store respective information of the first to fourth weight application signals W1, W2, W3 and W4, and determine and output the voltage levels of the first to fourth weight application signals W1, W2, W3 and W4 according to the information.

The first interference cancellation circuit 110-1 may be embodied by excluding the first cursor component cancellation circuit 112 among the components configuring the first interference cancellation circuit 110 illustrated in FIG. 3, that is, the buffer 111 and the first to fourth cursor component cancellation circuits 112, 113, 114 and 115. Since configurations of the buffer 111 and the second to fourth cursor component cancellation circuits 113, 114 and 115 are described above, descriptions thereof will be omitted herein.

The second to fourth cursor component cancellation circuits 113, 114 and 115 may determine amounts of sink currents to be flowed to the ground terminal VSS according to the voltage levels of the respective weight application signals W2, W3 and W4 inputted thereto. The second to fourth cursor component cancellation circuits 113, 114 and 115 may determine the cancellation timings of the second to fourth post cursor components by flowing the sink currents to the ground terminal VSS in response to the first sampling signal D_sA and the output signals of the shift registers 311 and 322 which is are fed back.

The symbol interference cancellation circuit in accordance with an embodiment, configured as mentioned above, may operate as follows.

The first and second interference cancellation circuits 110-1 and 120-1 may cancel the second to fourth post cursor components of the input signal D_in in response to the first and second sampling signals D_sA and D_sB, the output signals of the shift registers 311, 312, 321 and 322 and the second to fourth weight application signals W2, W3 and W4, and generate the first and second interference-cancelled signals D_icA and D_icB which are cancelled with the second to fourth post cursor components.

The first interference cancellation circuit 110-1 may cancel the second post cursor component of the input signal D_in which is inputted to the first interference cancellation circuit 110-1, in response to the first sampling signal D_sA and the second weight application signal W2. The first interference cancellation circuit 110-1 may cancel the third post cursor component of the input signal D_in which is inputted to the first interference cancellation circuit 110-1, in response to the output signal of the second-second shift register 322 and the third weight application signal W3. The first interference cancellation circuit 110-1 may cancel the fourth post cursor component of the input signal D_in which is inputted to the first interference cancellation circuit 110-1, in response to the output signal of the first-first shift register 311, that is, the first output signal D_outA, and the fourth weight application signal W4. The second interference cancellation circuit 120-1 may cancel the second post cursor component of the input signal D_in which is inputted to the second interference cancellation circuit 120-1, in response to the second sampling signal D_sB and the second weight application signal W2. The second interference cancellation circuit 120-1 may cancel the third post cursor component of the input signal D_in which is inputted to the second interference cancellation circuit 120-1, in response to the output signal of the first-second shift register 312 and the third weight application signal W3. The second interference cancellation circuit 120-1 may cancel the fourth post cursor component of the input signal D_in which is inputted to the second interference cancellation circuit 120-1, in response to the output signal of the second-first shift register 321, that is, the second output signal D_outB, and the fourth weight application signal W4. The weight control circuit 400 may output the first to fourth weight application signals W1, W2, W3 and W4 of which voltage levels are determined according to informations on interferences between symbols. The weight control circuit 400 may determine the voltage levels of the first to fourth weight application signals W1, W2, W3 and W4 according to the interference amounts of the first to fourth post cursor components, and store the first to fourth weight application signals W1, W2, W3 and W4 of the determined voltage levels.

The sampling circuit 200-1 may cancel the first post cursor component of the first interference-cancelled signal D_icA in response to the first weight application signal W1 and the clock CLK signal, sample the first interference-cancelled signal D_icA cancelled with the first post cursor component, in response to the clock CLK signal, and output a sampling result as the first sampling signal D_sA. The sampling circuit 200-1 may cancel the first post cursor component of the second interference-cancelled signal D_icB in response to the first weight application signal W1 and the clock CLK signal, and output the second interference-cancelled signal D_icB cancelled with the first post cursor component as the second sampling signal D_sB.

The first-first shift register 311 may shift the first sampling signal D_sA by the predetermined cycle (for example, 1 cycle) of the clock CLK signal, and output the first output signal D_outA.

The first-second shift register 312 may shift the first sampling signal D_sA by the predetermined cycle (for example, 1 cycle) of the clock bar CLK_b signal, and output the output signal.

The second-first shift register 321 may shift the second sampling signal D_sB by the predetermined cycle (for example, 1 cycle) of the clock CLK signal, and output the second output signal D_outB.

The second-second shift register 322 may shift the second sampling signal D_sB by the predetermined cycle (for example, 1 cycle) of the clock bar CLK_b signal, and output the output signal.

The symbol interference cancellation circuit according to an embodiment illustrated in FIG. 6 is different from the symbol interference cancellation circuit according to an embodiment illustrated in FIG. 2 in terms of cancellation timing of the third post cursor component. In a present embodiment, the first and second sampling signals D_sA and D_sB are shifted by using the clock bar CLK_b signal which is faster by one half cycle than the clock CLK signal, and the shifted first and second sampling signals D_sA and D_sB are used in cancelling the third post cursor component. As a consequence, in the symbol interference cancellation circuit according to an embodiment illustrated in FIG. 6, when compared to the symbol interference cancellation circuit according to an embodiment illustrated in FIG. 2, a timing for cancelling the third post cursor component may be advanced by the half cycle of the clock CLK signal, and thus, it may be possible to increase the response speed of the symbol interference cancellation circuit.

Figure 7:
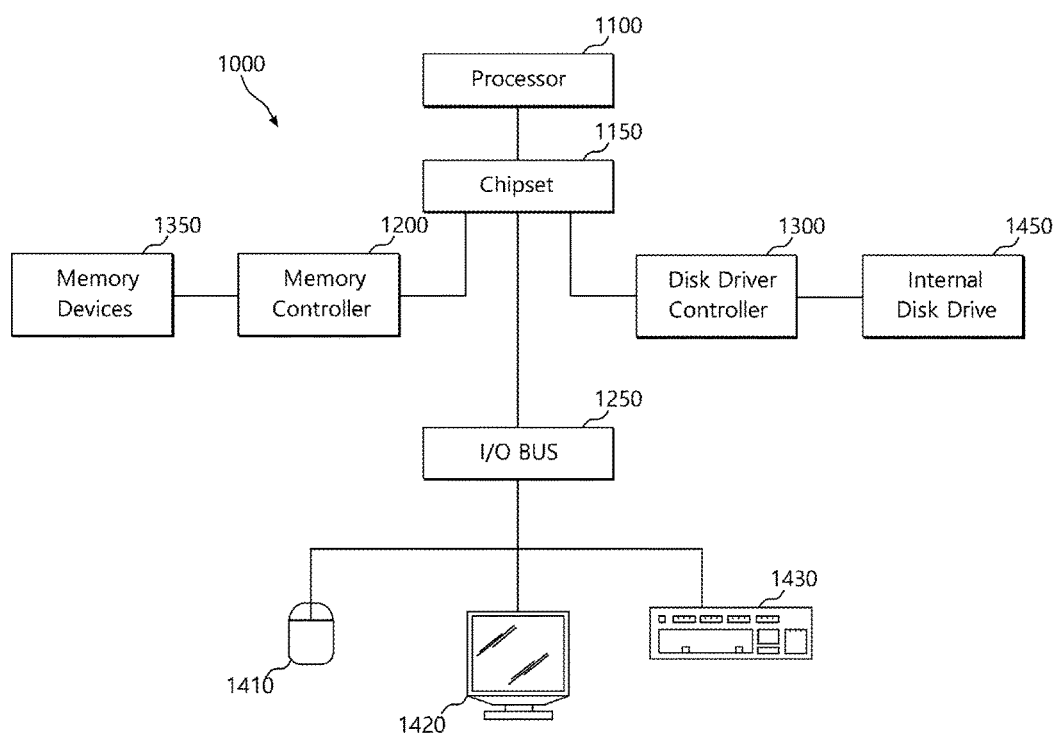
FIG. 7 illustrates a block diagram of an example of a representation of a system employing a symbol interference cancellation circuit with the various embodiments discussed above with relation to FIGS. 2-6.

The symbol interference cancellation circuits as discussed above (see FIGS. 2-6) are particular useful in the design of other memory devices, processors, and computer systems. For example, referring to FIG. 7, a block diagram of a system employing a symbol interference cancellation circuit in accordance with the various embodiments are illustrated and generally designated by a reference numeral 1000. The system 1000 may include one or more processors (i.e., Processor) or, for example but not limited to, central processing units ("CPUs") 1100. The processor (i.e., CPU) 1100 may be used individually or in combination with other processors (i.e., CPUs). While the processor (i.e., CPU) 1100 will be referred to primarily in the singular, it will be understood by those skilled in the art that a system 1000 with any number of physical or logical processors (i.e., CPUs) may be implemented.

A chipset 1150 may be operably coupled to the processor (i.e., CPU) 1100. The chipset 1150 is a communication pathway for signals between the processor (i.e., CPU) 1100 and other components of the system 1000. Other components of the system 1000 may include a memory controller 1200, an input/output ("I/O") bus 1250, and a disk driver controller 1300. Depending on the configuration of the system 1000, any one of a number of different signals may be transmitted through the chipset 1150, and those skilled in the art will appreciate that the routing of the signals throughout the system 1000 can be readily adjusted without changing the underlying nature of the system 1000.

As stated above, the memory controller 1200 may be operably coupled to the chipset 1150. The memory controller 1200 may include at least one symbol interference cancellation circuit as discussed above with reference to FIGS. 2-6. Thus, the memory controller 1200 can receive a request provided from the processor (i.e., CPU) 1100, through the chipset 1150. In alternate embodiments, the memory controller 1200 may be integrated into the chipset 1150. The memory controller 1200 may be operably coupled to one or more memory devices 1350. In an embodiment, the memory devices 1350 may include the at least one symbol interference cancellation circuit as discussed above with relation to FIGS. 2-6, the memory devices 1350 may include a plurality of word lines and a plurality of bit lines for defining a plurality of memory cells. The memory devices 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may also be coupled to the I/O bus 1250. The I/O bus 1250 may serve as a communication pathway for signals from the chipset 1150 to I/O devices 1410, 1420, and 1430. The I/O devices 1410, 1420, and 1430 may include, for example but are not limited to, a mouse 1410, a video display 1420, or a keyboard 1430. The I/O bus 1250 may employ any one of a number of communications protocols to communicate with the I/O devices 1410, 1420, and 1430. In an embodiment, the I/O bus 1250 may be integrated into the chipset 1150.

The disk driver controller 1300 may be operably coupled to the chipset 1150. The disk driver controller 1300 may serve as the communication pathway between the chipset 1150 and one internal disk driver 1450 or more than one internal disk driver 1450. The internal disk driver 1450 may facilitate disconnection of the external data storage devices by storing both instructions and data. The disk driver controller 1300 and the internal disk driver 1450 may communicate with each other or with the chipset 1150 using virtually any type of communication protocol, including, for example but not limited to, all of those mentioned above with regard to the I/O bus 1250.

It is important to note that the system 1000 described above in relation to FIG. 7 is merely one example of a symbol interference cancellation circuit as discussed above with relation to FIGS. 2-6. In alternate embodiments, such as, for example but not limited to, cellular phones or digital cameras, the components may differ from the embodiments illustrated in FIG. 7.

While various embodiments have been described above, it will be understood to those skilled in the art that the embodiments described are examples only. Accordingly, the symbol interference cancellation circuit described herein should not be limited based on the described embodiments.

What is claimed is:

1. A symbol interference cancellation circuit comprising:
a CTLE (continuous time linear equalizer) configured for cancelling a first post cursor component of an input signal according to a first weight application signal, and generating a pre-interference-cancelled signal;
an interference cancellation circuit configured for cancelling a second post cursor component, a third post cursor component and a fourth post cursor component of the pre-interference-cancelled signal according to a second weight application signal, a third weight application signal, a fourth weight application signal, a sampling signal and output signals of shift registers, and generating an interference-cancelled signal; and
a sampling circuit configured for sampling the interference-cancelled signal based on a clock signal, and outputting the sampled interference-cancelled signal as the sampling signal,
wherein the shift registers, configured for shifting the sampling signal by a predetermined cycle of a clock bar signal which has a phase opposite to the clock signal, shift the sampling signal by a predetermined cycle of the clock signal, and thereby provide shifted signals to the interference cancellation circuit.

2. The symbol interference cancellation circuit according to claim 1, further comprising:
a weight control circuit configured for storing and outputting the first to fourth weight application signals.

3. The symbol interference cancellation circuit according to claim 1, wherein the shift registers comprise:
at least one first shift register configured for shifting the sampling signal by the predetermined cycle of the clock signal based on the clock signal, and outputting the output signal; and
at least one second shift register configured for shifting the sampling signal by the predetermined cycle of the clock bar signal based on the clock bar signal, and outputting the output signal.

4. The symbol interference cancellation circuit according to claim 1, wherein the interference cancellation circuit comprises:
a buffer configured for being inputted with the pre-interference-cancelled signal inputted to the interference cancellation circuit; and
cursor component cancellation circuits coupled to an output terminal of the buffer, and configured for cancelling the second to fourth post cursor components based on the second to fourth weight application signals, the sampling signal and the output signals of the shift registers.

5. The symbol interference cancellation circuit according to claim 4, wherein each of the cursor component cancellation circuits comprises:
at least one first transistor having a drain to which the output terminal of the buffer is coupled and a gate to which an output signal of a corresponding shift register or the sampling signal is inputted; and
a second transistor having a drain to which a source of the first transistor is coupled, a gate to which a corresponding weight application signal is inputted and a source to which a ground terminal is coupled.

6. A symbol interference cancellation circuit comprising:
a CTLE (continuous time linear equalizer) configured for cancelling a first post cursor component of an input signal according to a first weight application signal, and generating a pre-interference-cancelled signal;
a first interference cancellation circuit configured for cancelling a second post cursor component, a third post cursor component and a fourth post cursor component of the pre-interference-cancelled signal according to a second weight application signal, a third weight application signal, a fourth weight application signal, a first sampling signal and output signals of a first-first shift register and a second-second shift register, and generating a first interference-cancelled signal;
a second interference cancellation circuit configured for cancelling a second post cursor component, a third post cursor component and a fourth post cursor component of the pre-interference-cancelled signal according to the second weight application signal, the third weight application signal, the fourth weight application signal, a second sampling signal and output signals of a first-second shift register and a second-first shift register, and generating a second interference-cancelled signal;
a first sampling circuit configured for sampling the first interference-cancelled signal based on a clock signal, and outputting the sampled first interference-cancelled signal as the first sampling signal; and
a second sampling circuit configured for sampling the second interference-cancelled signal based on the clock signal, and outputting the sampled second interference-cancelled signal as the second sampling signal,
wherein the first-first shift register is configured for shifting the first sampling signal by a predetermined cycle of the clock signal, and outputting the output signal,
wherein the first-second shift register is configured for shifting the first sampling signal by a predetermined cycle of a clock bar signal which has a phase opposite to the clock signal, and outputting the output signal,
wherein the second-first shift register is configured for shifting the second sampling signal by a predetermined cycle of the clock signal, and outputting the output signal, and
wherein the second-second shift register is configured for shifting the second sampling signal by a predetermined cycle of the clock bar signal, and outputting the output signal.

7. The symbol interference cancellation circuit according to claim 6, further comprising:
a weight control circuit configured for storing and outputting the first to fourth weight application signals.

8. The symbol interference cancellation circuit according to claim 6, wherein the pre-interference-cancelled signal is a differential signal.

9. The symbol interference cancellation circuit according to claim 6, wherein the first interference cancellation circuit comprises:
a buffer configured for buffering the pre-interference-cancelled signal;
a second cursor component cancellation circuit configured for cancelling the second post cursor component based on the first sampling signal and the second weight application signal;
a third cursor component cancellation circuit configured for cancelling the third post cursor component based on the output signal of the second-second shift register and the third weight application signal; and
a fourth cursor component cancellation circuit configured for cancelling the fourth post cursor component based on the output signal of the first-first shift register and the fourth weight application signal.

10. The symbol interference cancellation circuit according to claim 6, wherein the second interference cancellation circuit comprises:
a buffer configured for buffering the pre-interference-cancelled signal;
a second cursor component cancellation circuit configured for cancelling the second post cursor component based on the second sampling signal and the second weight application signal;
a third cursor component cancellation circuit configured for cancelling the third post cursor component based on the output signal of the first-second shift register and the third weight application signal; and
a fourth cursor component cancellation circuit configured for cancelling the fourth post cursor component based on the output signal of the second-first shift register and the fourth weight application signal.

11. A symbol interference cancellation circuit comprising:
an interference cancellation circuit configured for cancelling a second post cursor component, a third post cursor component and a fourth post cursor component of an input signal according to a second weight application signal, a third weight application signal, a fourth weight application signal, a sampling signal and output signals of shift registers, and generating an interference-cancelled signal; and a sampling circuit configured for cancelling a first post cursor component of the interference-cancelled signal based on a first weight application signal and a clock signal, sample the interference-cancelled signal cancelled with the first post cursor component, and generating the sampling signal, wherein the shift registers configured for shifting the sampling signal by a predetermined cycle of a clock bar signal which has a phase opposite to the clock signal, shift the sampling signal by a predetermined cycle of the clock signal, and thereby provide shifted signals to the interference cancellation circuit.

12. The symbol interference cancellation circuit according to claim 11, further comprising:
a weight control circuit configured for storing and outputting the first to fourth weight application signals.

13. The symbol interference cancellation circuit according to claim 11, wherein the shift registers comprise:
at least one first shift register configured for shifting the sampling signal by the predetermined cycle of the clock signal based on the clock signal, and outputting the output signal; and
at least one second shift register configured for shifting the sampling signal by the predetermined cycle of the clock bar signal based on the clock bar signal, and outputting the output signal.

14. The symbol interference cancellation circuit according to claim 11, wherein the interference cancellation circuit comprises:
a buffer configured for being inputted with the input signal inputted to the interference cancellation circuit; and
cursor component cancellation circuits coupled to an output terminal of the buffer, and configured for cancelling the second to fourth post cursor components based on the second to fourth weight application signals, the sampling signal and the output signals of the shift registers.

15. The symbol interference cancellation circuit according to claim 14, wherein each of the cursor component cancellation circuits comprises:
at least one first transistor having a drain to which the output terminal of the buffer is coupled and a gate to which an output signal of a corresponding shift register or the sampling signal is inputted; and
a second transistor having a drain to which a source of the first transistor is coupled, a gate to which a corresponding weight application signal is inputted and a source to which a ground terminal is coupled.

16. A symbol interference cancellation circuit comprising:
a first interference cancellation circuit configured for cancelling a second post cursor component, a third post cursor component and a fourth post cursor component of an input signal according to a second weight application signal, a third weight application signal, a fourth weight application signal, a first sampling signal and output signals of a first-first shift register and a second-second shift register, and generating a first interference-cancelled signal;
a second interference cancellation circuit configured for cancelling a second post cursor component, a third post cursor component and a fourth post cursor component of the input signal according to the second weight application signal, the third weight application signal, the fourth weight application signal, a second sampling signal and output signals of a first-second shift register and a second-first shift register, and generating a second interference-cancelled signal;
a sampling circuit configured for cancelling first post cursor components of the first and second interference-cancelled signals based on a first weight application signal and a clock signal, sample the first and second interference-cancelled signals cancelled with the first post cursor components, and generating the first and second sampling signals, wherein the first-first shift register is configured for shifting the first sampling signal by a predetermined cycle of the clock signal, and outputting the output signal, wherein the first-second shift register is configured for shifting the first sampling signal by a predetermined cycle of a clock bar signal which has a phase opposite to the clock signal, and outputting the output signal, wherein the second-first shift register is configured for shifting the second sampling signal by a predetermined cycle of the clock signal, and outputting the output signal, and wherein the second-second shift register is configured for shifting the second sampling signal by a predetermined cycle of the clock bar signal, and outputting the output signal.

17. The symbol interference cancellation circuit according to claim 16, further comprising:
a weight control circuit configured for storing and outputting the first to fourth weight application signals.

18. The symbol interference cancellation circuit according to claim 16, wherein the input signal is a differential signal.

19. The symbol interference cancellation circuit according to claim 16, wherein the first interference cancellation circuit comprises:
a buffer configured for buffering the input signal;
a second cursor component cancellation circuit configured for cancelling the second post cursor component based on the first sampling signal and the second weight application signal;
a third cursor component cancellation circuit configured for cancelling the third post cursor component based on the output signal of the second-second shift register and the third weight application signal; and
a fourth cursor component cancellation circuit configured for cancelling the fourth post cursor component based on the output signal of the first-first shift register and the fourth weight application signal.

20. The symbol interference cancellation circuit according to claim 16, wherein the second interference cancellation circuit comprises:
a buffer configured for buffering the input signal;
a second cursor component cancellation circuit configured for cancelling the second post cursor component based on the second sampling signal and the second weight application signal;
a third cursor component cancellation circuit configured for cancelling the third post cursor component based on the output signal of the first-second shift register and the third weight application signal; and
a fourth cursor component cancellation circuit configured for cancelling the fourth post cursor component based on the output signal of the second-first shift register and the fourth weight application signal.

* * * * *